Sept. 13, 1932.    A. P. STRONG    1,877,206
SHAFT BEARING
Filed May 11, 1927
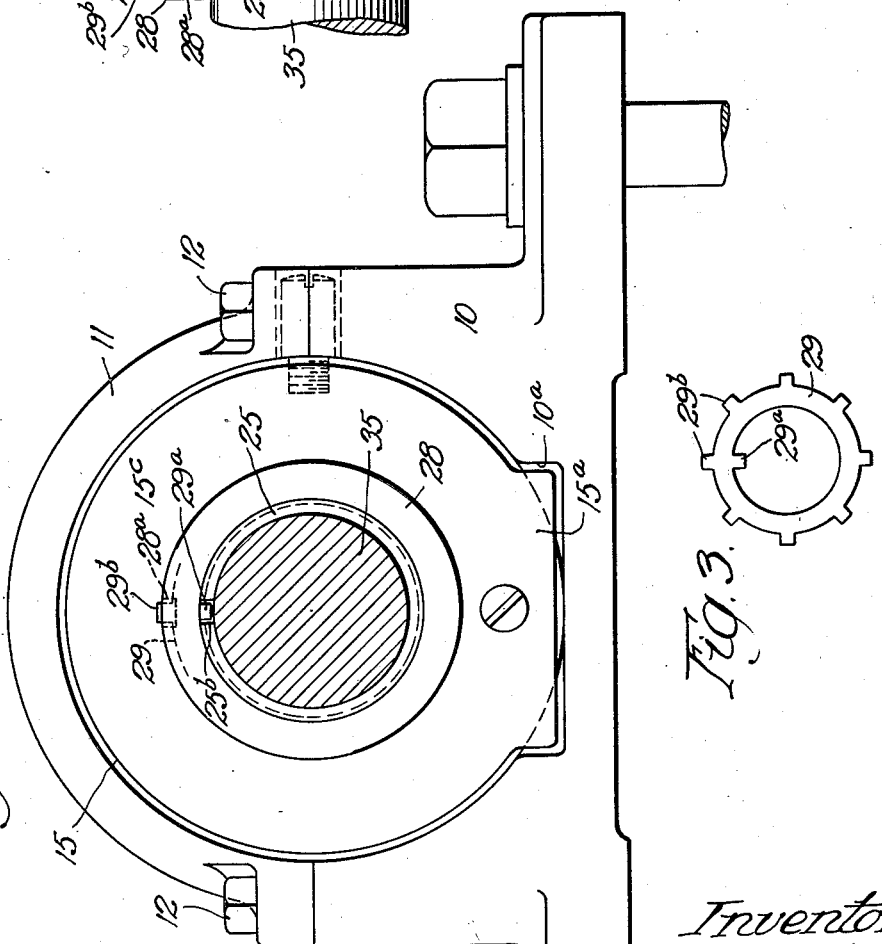
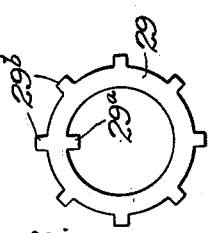
Inventor
Arthur P. Strong Patented Sept. 13, 1932

1,877,206

UNITED STATES PATENT OFFICE

ARTHUR P. STRONG, OF CHICAGO, ILLINOIS, ASSIGNOR TO DODGE MANUFACTURING CORPORATION, OF MISHAWAKA, INDIANA, A CORPORATION OF DELAWARE

SHAFT BEARING

Application filed May 11, 1927. Serial No. 190,389.

This invention relates to improvements in shaft bearings, and has among its objects to provide a bearing construction for a shaft or the like which can be assembled in proper adjustment at the factory, shipped to the user without danger of leakage of the grease or lubricant or entrance of dirt, dust or the like into the lubricant chamber, and which may be assembled with the shaft or other element to be journaled without danger or disassembly of the component parts other than the adjustment necessary to clamp the rotating portion to the shaft.

Another object is to provide a bearing construction in which play may be eliminated from the bearing elements proper without disturbance of the structure generally by disassembly, and which adjustment may be made from the exterior of the bearing.

Another object resides in the provision of a new and improved means to lock the adjusting elements in adjusted position.

Another object resides in the provision of a bearing structure provided with a grease or lubricant seal whose concentricity with the rotating portions of the bearing structure will be maintained despite disalignment or rocking of the shaft or other supported element.

Another object resides in the provision of bearing structure in which expansive or contractive movement of the shaft or supported element is permitted, and also provision is made for rocking movement, means being provided to prevent rotation of the housing elements with the shaft.

Moreover, it is an object of this invention to provide a shaft bearing construction of highly efficient and advantageous character, having in view the efficient mounting of a power transmission shaft.

Other objects reside in the details and arrangement of the elements, as will more fully appear from the following specification and shown in the accompanying drawing in which—

Fig. 1 is an end elevation of a bearing embodying my invention.

Fig. 2 is a partial longitudinal section thereof.

Fig. 3 is an elevation of the locking ring.

10 indicates a housing having the removable cap 11 secured thereto by cap screws 12. Concentric with and mounted in the outer housing is the inner housing 15 having the projecting rib or shoulder $15^f$ of spherical contour, this rib contacting with the inner surface of the outer housing 10 and its cap 11 to prevent radial movement between the two housings while permitting a rocking or longitudinal movement of the inner housing with respect to the outer housing to accommodate expansion or contraction of the shaft or slight rocking or disalignment thereof, as will be apparent.

The inner housing 15 is provided with the outwardly projecting lugs or shoulders $15^a$ at each end at the bottom, the same being located within corresponding recesses $10^a$ in the outer housing, although being slightly spaced therefrom. The lugs on the sides of the recesses will coact to prevent any substantial rotative movement of the inner housing 15 with respect to the outer housing 10 and cap 11, i. e., rotation with the supported shaft or the like, and will so limit the relative longitudinal movement as to prevent, for example, the inner housing 15 from dropping out of the outer housing in use or in shipment.

The inner housing 15 is provided with the shoulder $15^b$ on its inner wall and is inwardly flanged as indicated by numeral $15^c$ at one end, this flange being provided with the parallel chambers $15^d$, the purpose of which will be described below. At its other end the housing 15 is open and internally threaded as indicated by numeral $15^e$, a detachable collar 16 being threaded thereinto, this conforming generally in construction to the flange $15^c$ and being similarly provided with chambers $16^a$. The inner portion of the outer peripheral surface of the collar 16 is unthreaded and of slightly less diameter than the threaded portion to afford a bearing or contacting surface for set screw 20 threaded through housing 15, as illustrated in Fig. 2.

A concentric tapered split tube 25 is provided. This has the inclined outer surface 25' upon which is mounted the sleeve 27 having a complementary inclined surface, as illustrated in Fig. 2. Sleeve 27 is provided with the bearing raceways 27ª, 27ᵇ, separated by a central shoulder 27ᶜ and diverging outwardly therefrom.

A supplemental sleeve 26 is inserted through the end 15ᶜ of the inner housing 15 in contact with the sleeve 27. The smaller end of the tube 25 is threaded as indicated at 25ª for engagement by the ring 28. The tube 25 is also provided with the slot 25ᵇ into which projects the lug 29ª of a locking ring 29 having a plurality of spaced outwardly projecting fingers 29ᵇ. This collar 29 is preferably of metal sufficiently soft to permit bending over of any of the fingers 29ᵇ, and at the inner edge of ring 28 is provided a notch 28ª to receive any one of the fingers 29ᵇ when thus bent over. Concentric with the sleeve 27 and spaced therefrom are the bearing cups 31, 32, the former being pressed into contact with the shoulder 15ᵇ and the latter being moved to and held in position by the inwardly projecting shoulder of the collar 16.

Tapered bearing rollers 34 are interposed between the races 27ª, 27ᵇ, and the cups 31 and 32, being arranged with the smaller tapered ends directed outwardly of the housing.

In assembly of the bearing structure, the sleeve 27 and cups 31 and 32 are properly aligned with the rollers 34 interposed with sufficient play or clearance for proper functioning. These elements having been properly positioned, the collar 16 is threaded into position to maintain the bearing elements properly positioned and the set screw 20 is screwed home to hold these elements in such position.

The ring 28 is threaded sufficiently along the tube 25 to hold the tube, sleeve and other elements securely in assembled relation, after which the bearing structure as a whole may be shipped to the user who will slide it over the shaft or other supported element to proper position, after which the ring 28 is rotated sufficiently to draw the tube 25 into tight gripping engagement with the shaft 35, the wedging action between the tube and the sleeve 27 effecting this clamping engagement. One of the fingers 29ᵇ is then bent over into the notch 28ª, locking ring 28 against reverse rotation, thereby securing the elements of the bearing structure to the shaft 35. This assembly of the bearing structure with respect to the shaft is thus effected without disturbance of the bearing elements proper, which remain in the proper adjusted relation provided at the factory, no disassembly, in the main, of the bearing structure generally, being required.

Should occasion arise for readjustment of the bearing elements to take up wear, excess play or the like, it is merely necessary to release the set screw 20, engage the collar 16 with the proper tool and rotate the same until the bearing cups and sleeve 27 are properly adjusted, after which the collar 16 is locked in position, all of this adjustment operation being possible without disassembly of the bearing structure generally, and by easy access from the exterior of the device.

The inner peripheries of the flange 15ᶜ and the collar 16 are so constructed as to lie closely adjacent to, although slightly spaced from the outer surface of the tube 25. This concentric relation is maintained despite disalignment or rocking of the shaft 35, since tube 25, which rotates with the shaft and sleeve 27, will move with such shaft and move the housing 15 simultaneously. The chambers 15ᵈ and 16ª permit entrance of grease or other heavy lubricant which thus functions as a seal to prevent ingress of foreign matter or egress of the lubricant from the interior of the inner housing 15. This type of grease seal is made available for use by maintenance of the concentricity between the collars 15ᶜ and 16 and the rotating tube 25.

The sleeve 27, the ring or collar 28 and the collar 16 cover the slot or split in the tube 25 throughout substantially the entire width of the interior of the housing, which constitutes a lubricant or grease chamber so that where grease, for example, is used as a lubricant, the bearing structure may be shipped in assembled relation, charged with lubricant, without danger of exudation of the lubricant in shipment or without entrance of dirt, dust or other foreign matter which would be detrimental to the bearings.

It will be seen that the illustrative construction embodies an encased bearing, adjustable to establish a predetermined running clearance between the bearing elements, in assembly with an outer housing in which the inner housing or bearing case is mounted to permit self-adaptation of the bearing to the shaft alinement as well as to accommodate shaft expansion and contraction, and with a central shaft sleeve for application to a shaft, the said shaft sleeve (represented by the contractile tube 25) extending through the ends of the inner housing or bearing case which are constructed to provide grease seals therearound; and that the adjustment of the bearing for determining the running clearance is effected by exteriorly manipulatable means at one end of the bearing case, represented by the adjusting ring 16, while the operation for clamping the shaft sleeve to the shaft is effected by independent exteriorly manipulatable adjusting means at one end of the bearing case, represented by the nut 28 screwed on the smaller end of the tube 25 and which through the thrust ring or spacing collar 26 acts against the inner bearing ring or sleeve 27 to draw the contractile shaft sleeve in relation to its surrounding sleeve to effect the clamping action.

The encased bearing in this instance is a highly efficient and serviceable duplex unit provided by the two annular series of tapered bearing rollers, symmetrically arranged to sustain equally the radial load and respectively to sustain the opposite axial thrusts, running on the bearing cones provided on the inner bearing ring (which in this instance is supplied by the sleeve 27 enclosing the contractile shaft sleeve or tube 25), and running in the bearing cup rings fitted in the bearing case or inner housing 15. By providing the bearing cones for the two roller trains on a single inner bearing ring, which may be termed a double bearing cone ring, there is the advantage, among others, that it is practical to use this ring as the interiorly tapered sleeve to fit on and coact with the single exteriorly tapered shaft sleeve or tube 25.

In conjunction with the self-adaptability of the encased bearing to the shaft alinement (by virtue of the mounting of the inner housing in the outer housing with capacity for free universal angular play or rocking movement about the center of the bearing), the duplex bearing in itself is capable of a slight self-adjustment to accommodate minor variations in shaft alinement which occur in every revolution of a shaft rotating at high speed. This is because the two annular trains of tapered bearing rollers are adjacent in the sense that they are comparatively close together, for example as shown in the drawing, and are arranged with the larger ends of the rollers of the two series confronting or toward one another, and the form and arrangement of the bearing elements are such that the outer bearing surfaces of the rollers (i. e. the surfaces in contact with the bearing cups) are approximately or nearly tangential to an imaginary sphere concentric with the bearing. For example, in the case of the bearing employed in the illustrative construction, if a circle be drawn from its center (i. e. from a point on the axis midway between the two series of rollers), and on such a radius as to intersect the outer bearing surfaces of the rollers at their larger ends, such circle will intersect the smaller ends of the rollers only slightly below their outer surfaces. Thus the rollers of the two series bear in their bearing cups nearly along or approximately tangential to an arc of such a circle. By thus constructing the bearing with the two series of tapered bearing rollers arranged comparatively near together, with the larger ends of the rollers of the two series toward one another, and with the outer bearing surfaces of the rollers approximately or nearly tangential to such a circle (or, more accurately speaking, approximately tangential to an imaginary sphere concentric with the center of the duplex bearing), and there being the normal or proper working clearance between the tapered bearing rollers and their bearing rings, a slight or minute rocking of the inner bearing ring and rollers in relation to the outer bearing rings is permitted, which will be sufficient to compensate for the minor misalinement occurring in each shaft revolution.

Thus, the construction described embodies provision for a two-fold self-adjustment of the shaft bearing to accommodate shaft alinement, namely, the capacity for self-positioning of the bearing to correct the larger errors in alinement, such for instance as those due to incorrect or changing housing position, and a capacity for what may be termed a micrometric self-aligning feature in the bearing itself to take care of the minor errors in each revolution of the shaft.

The minor misalinement which takes place in every shaft revolution at high speed causes a rocking in or of the bearing with accelerating and decelerating motions. If these motions, which are of high frequency, were imparted to the entire bearing and inner housing or case in which it is mounted, then in view of the inertia of the relatively large mass to be rocked, and the extent and consequently the velocity of the accelerating and decelerating motions imparted to the housing, the bearing rollers would be subjected with correspondingly high frequency to severe stresses. It is therefore highly desirable to enable the bearing to respond to the minor misalinements occurring in the individual shaft revolutions by the rocking of the inner bearing ring and rollers relative to the outer bearing rings. In this case the mass to be rocked and the extent of motion are small and the strain is accordingly light.

Under normal operating conditions then, due to the necessary running clearance between the bearing rollers and their cup and cone surfaces, the minor shaft misalinement which comes with every revolution at high speed will effect a slight self-adjustment in the bearing itself, which will be taken care of through the compression of the grease films between the bearing rollers and the cups, and both roller trains will carry an equal share of the load. In case of occasional misalinement in excess of the amount to which the bearing can respond in this way, then the outer ends of the rollers of one series will press sufficiently heavily against the corresponding cup to move the bearing case in relation to the outer housing on the contact of the spherically surfaced rim $15^f$. Since such a load will, of course, be only momentary, it will not be beyond the capacity of the rollers to stand.

Preferably the roller trains should not be so close together that the outer surfaces of the rollers would be entirely within the sphere previously referred to, since in that case there would be a greater permissible rocking than desired; while on the other hand the roller trains should not be spaced so far apart that the outer surfaces of the rollers would be principally or wholly outside of the sphere, since in that case there would be too little permissible rocking. The spacing of the roller trains shown in the drawing is the preferred spacing for the particular duplex bearing shown. The spacing may vary in different bearings, according to the size of bore of the cup rings, the included angle between the cup and cone surfaces and the angles of these surfaces to the shaft axis.

It will be apparent that my invention is susceptible of variation and modification from the form shown and described, and I do not wish to be restricted to such form, except as defined in the appended claims.

What I claim is:

1. A shaft bearing device embodying a case and a contained shaft bearing in fixed assembly therewith, said bearing comprising a double bearing cone ring and two separate bearing cup rings and two annular trains of tapered bearing rollers interposed between the respective cup rings and cones of the cone ring, the said trains of rollers and their bearing surfaces being in symmetry and arranged with the larger ends of the rollers of the two trains confronting one another, the bearing case having an external spherical surface by which said case with the contained bearing may be mounted in a supporting housing with capacity to adjust itself angularly to suit shaft alinement, and the said bearing constructed and arranged with the two trains of rollers adjacent and with the outer bearing surfaces of the rollers approximately tangential to a sphere concentric with the center of the bearing, thereby providing for a limited minute self-adjustment of the bearing in response to minor fluctuations in alinement of the shaft axis accompanying individual shaft revolutions at high speed, while any misalinement in excess of that to which the bearing can respond in this way will cause an adjustment of the case by motion imparted through the bearing.

2. A shaft bearing device embodying a case and a contained shaft bearing, said bearing comprising two annular trains of tapered bearing rollers and two separate bearing cup rings therefore mounted in the case and two bearing cones for said series of rollers, the said bearing cones being in fixed relation, the said bearing case mounted with capacity to adjust itself angularly to suit shaft alinement, and the said bearing constructed and arranged with the two trains of rollers adjacent and with the larger ends of the rollers of the two series toward one another and with the outer bearing surfaces of the rollers approximately tangential to a sphere concentric with the center of the bearing, thereby providing for a limited minute self-adjustment of the bearing in response to minor fluctuations in alinement of the shaft axis accompanying individual shaft revolutions at high speed, while any misalinement in excess of that to which the bearing can respond in this way will cause an adjustment of the case by motion imparted through the bearing.

3. A shaft bearing device embodying a case and a contained shaft bearing in fixed assembly therewith, said bearing comprising a double bearing cone ring and two separate bearing cup rings and two annular trains of tapered bearing rollers interposed between the respective cup rings and cones of the cone ring, the said trains of rollers and their bearing surfaces being in symmetry and arranged with the larger ends of the rollers of the two trains confronting one another, the bearing case mounted with capacity to adjust itself angularly to suit shaft alinement, and the said bearing constructed and arranged with the two trains of rollers adjacent and with the outer bearing surfaces of the rollers approximately tangential to a sphere concentric with the center of the bearing, thereby providing for a limited minute self-adjustment of the bearing in response to minor fluctuations in alinement of the shaft axis accompanying individual shaft revolutions at high speed, while any misalinement in excess of that to which the bearing can respond in this way will cause an adjustment of the case by motion imparted through the bearing.

In testimony whereof, I have signed my name to this specification.

ARTHUR P. STRONG.